A6725 OR X 5,742
Locks.
R. EASTMAN.
Muzzle-loading Fire-arm.
5742x.
Patented Dec. 7, 1829.
Fig 1.
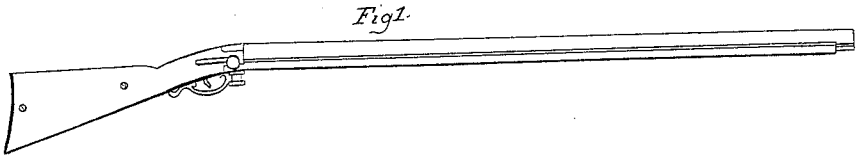
Fig 2.
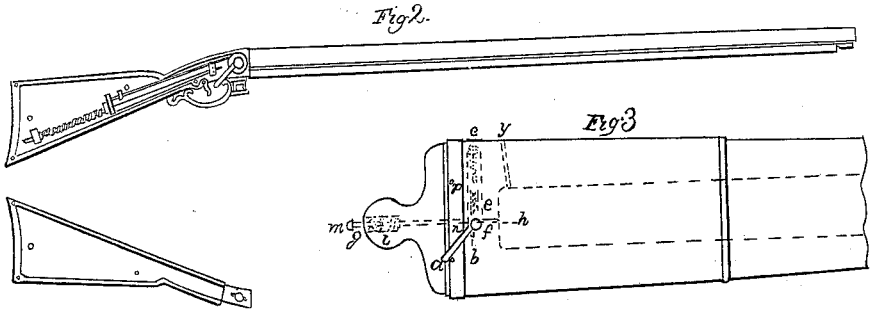
Fig 3
Fig 4.
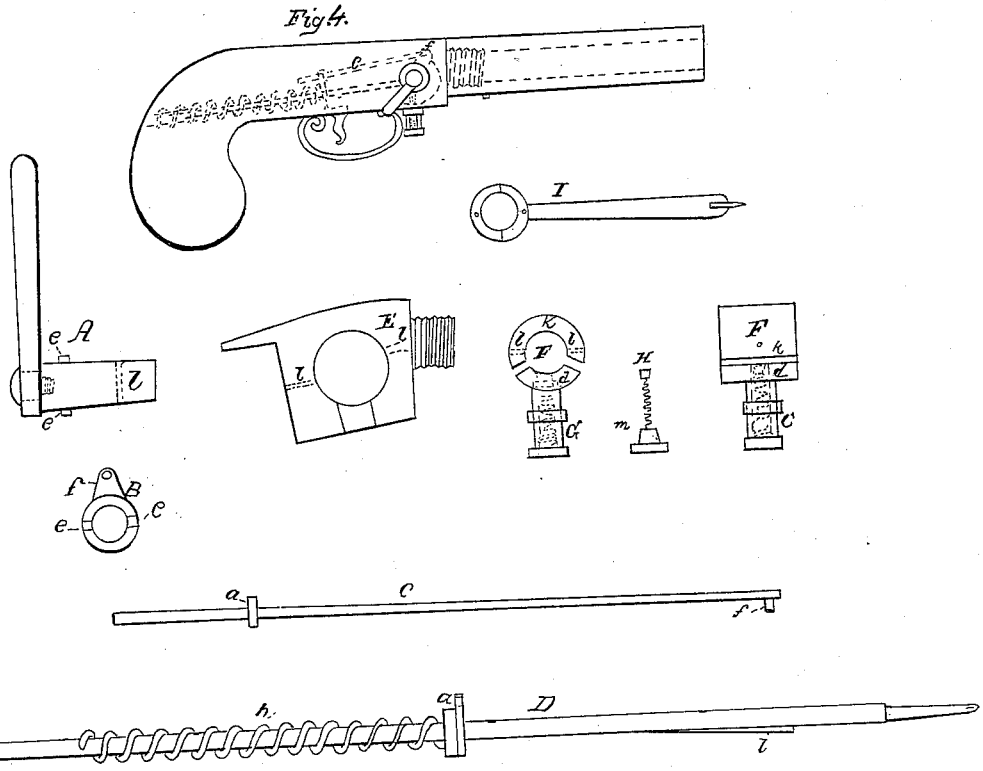
N. PETERS, PHOTO-LITHOGRAPHER, WASHINGTON, D. C.